3,388,091
RESINS AND ELASTOMERS FROM SILOXY CARBORANYL POLYMERS
Theodore L. Heying, North Haven, Stevie Papetti, Hamden, and Otto G. Schaffling, Cheshire, Conn., assignors to Olin Mathieson Chemical Corporation, a corporation of Virginia
Filed July 21, 1964, Ser. No. 384,216
9 Claims. (Cl. 260—37)

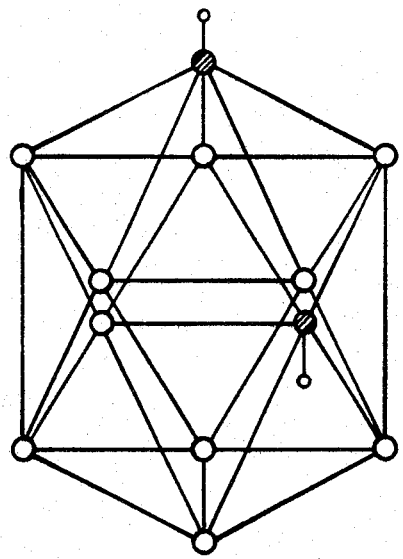
○ BORON
◉ CARBON
∘ HYDROGEN ON CARBON
(HYDROGEN ATOMS ON
BORON OMITTED FOR
CLARITY)
INVENTORS:
THEODORE L. HEYING
STELVIO PAPETTI
OTTO G. SCHAFFLING
BY Walter D. Hunter
AGENT United States Patent Office 3,388,091
Patented June 11, 1968

ABSTRACT OF THE DISCLOSURE

Polymers having recurring structural units of the formula:

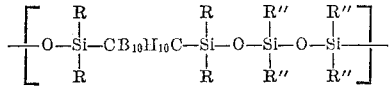

where each R and R'' substituent is independently selected alkyl of from 1 to 6 inclusive carbon atoms or aryl of not more than 8 carbon atoms, are prepared by reacting a bis(alkoxyldialkylsilyl) neocarborane with a halogen-containing disiloxane.

---

This invention relates to novel polymers containing both silicon and boron and to a process for their preparation. More particularly, this invention relates to polymers prepared by reacting an alkoxy-substituted neocarborane and a halogen-containing disiloxane in the presence of a catalyst.

The novel linear polymers of this invention contain a multiplicity of structural units of the following formula:

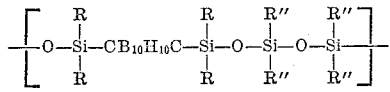

wherein each R substituent and each R'' substituent is an independently selected alkyl group of from 1 to 6 inclusive carbon atoms or an independently selected aryl group of not more than 8 carbon atoms. The —$CB_{10}H_{10}C$— unit in the above formula is derived from the meta isomer of carborane (i.e., neocarborane) which has the formula:

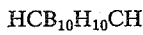

The spatial structure of neocarborane is shown in the drawing. The infrared spectrum of neocarborane is set forth by Graftstein et al. in Inorganic Chemistry, vol. 2, No. 6, December 1963, page 1129.

In the process of this invention polymers containing both silicon and boron are prepared by the condensation of an alkoxy-substituted neocarborane of the formula:

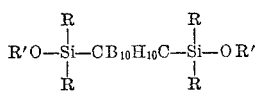

wherein each R substituent is an independently selected alkyl group of from 1 to 6 inclusive carbon atoms or aryl of not more than 8 carbon atoms and R' is alkyl of from 1 to 6 carbon atoms, with a halogen-containing disiloxane of the formula:

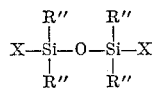

wherein each R'' substituent is an independently selected alkyl group of from 1 to 6 inclusive carbon atoms or an independently selected aryl group of not more than 8 carbon atoms and X is a halogen selected from the group consisting of chlorine, bromine, and iodine, in the presence of ferric chloride. Halogen-containing disiloxanes suitable as starting materials in the process of this invention include tetramethyldichlorodisiloxane, dimethyldi-n-propyldichlorodisiloxane, tetraethyldichlorodisiloxane, ethyldimethyl-n-propyldisiloxane, tetraisopropyldichlorodisiloxane, diethyldiamyldichlorodisiloxane, tetrahexyldichlorodisiloxane, diheptyldi-n-octyldichlorodisiloxane, tetraisooctyldichlorodistiloxane, di-n-nonyldiisooctyldichlorodisiloxane, tetradodecyldichlorodisiloxane, diethyldiphenyldisiloxane, dimethylditolyldichlorodisiloxane, di-n-propyldixylyldichlorodisiloxane, ethylisobutyldiphenyldichlorodisiloxane, di-n-propylditolyldichlorodisiloxane, tetraphenyldichlorodisiloxane, etc., and the corresponding bromine and iodine derivatives.

Included in the group of alkoxy-substituted neocarboranes useful as starting materials are bis(methoxydimethylsilyl) neocarborane, bis(methoxydiethylsilyl) neocarborane, bis(methoxymethylethylsilyl) neocarborane, bis(ethoxydipropylsilyl) n-butylneocarborane, bis(ethoxydimethylsilyl) neocarborane, bis(ethoxydi-n-propylsilyl) neocarborane, bis(ethoxyethylisopropylsilyl) neocarborane, bis-(n-propoxydiisopropylsilyl) ethylneocarborane, bis(n-propoxydiisoamylsilyl) neocarborane, bis(isopropoxy-di-n-propylsilyl) neocarborane, bis(n-butoxydimethylsilyl) neocarborane, bis(isobutoxydi-n-propylsilyl) neocarborane, bis(methoxydiphenylsilyl) neocarborane, bis(methoxymethylphenylsilyl) neocarborane, bis(methoxyphenyltolylsilyl) neocarborane, bis(ethoxydixylylsilyl) neocarborane, bis(isobutoxydiphenylsilyl) neocarborane, bis-(amyloxyphenylxylylsilyl) neocarborane, etc. These compounds can be made in the manner described in Heying and Papetti application, Ser. No. 361,409 filed Apr. 21, 1964 for Method and Composition. For example, the compound bis(methoxydimethylsilyl) neocarborane can be synthesized by reacting bis(chlorodimethylsilyl) neocarborane for 3 hours at room temperature with an excess of methanol.

In this invention, the reaction proceeds as shown below where, for purposes of illustration, the reaction between bis(methoxydimethylsilyl)neocarborane and tetramethyldichlorodisiloxane is shown:

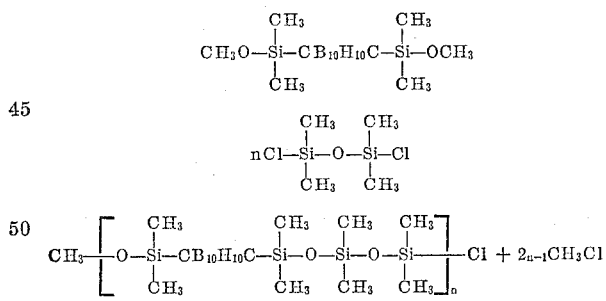

During the course of the reaction the alkyl chloride is given off and by measuring the gas evolved the extent of the reaction can be determined.

The temperature at which the reaction is carried out can be varied widely from about 75° to about 250° C. and preferably will be from about 90° to about 125° C. in the beginning and up to the time that about one half of the stoichiometric amount of the gaseous alkyl chloride is evolved. To complete the reaction it has been found necessary to increase the reaction temperature up to about 120° C. to about 250° C. and preferably up to about 120° C. to about 190° C. During the second stage of the reaction generally the reaction rate is much slower than during the first stage. The initial liquid reaction mixture becomes viscous after about 90 percent of the theoretical quantity of the alkyl chloride has been evolved and after about 95 percent has been evolved, the viscous material becomes a rubbery product. On continued heating of this product at about 150° to about 250° C. for one hour or more the product loses its tackiness. Thus, by varying the reaction time and temperature a wide variety of products with different physical properties can be prepared. The reaction time can be varied widely and generally will be from about 0.5 hour to about 5 hours depending on the reaction conditions and particular reactants employed. Higher temperatures have been investigated for this reaction, but they do not accelerate the rate and temperatures above about 250° C. must be avoided since the activity of the catalyst is slowly destroyed at such high temperatures.

The polymeric products of this invention range from liquids to completely rubbery materials. By the process of this invention polymeric products have a molecular weight from about 2,000 to about 100,000 or more can be conveniently prepared.

The liquid products of this invention are generally soluble in a wide variety of organic liquids such as ethers, ketones and aromatic hydrocarbons as exemplified by diethyl ether, N-methyl-2-pyrrolidone, methyl ethyl ketone a decalin, chlorobenzene, o-dichlorobenzene, bromobenzene aniline and xylene. The viscosity of the liquid products of this invention vary from highly liquid fluids to very viscous, tacky rubbery materials. The rubbery materials are insoluble or only partially soluble in any organic solvent, depending on the degree of polymerization. Thus by the process of this invention one may obtain rubbery products which are not tacky and which are insoluble in organic solvents.

The amount of the ferric chloride catalyst can be varied from about 0.01 to about 10 mole percent, based on the total number of moles of the neocarborane compound employed and preferably will be from about 0.05 to about 3.0 percent on the same basis. If during the course of the reactions the rate of reaction decreases to a low level or if the reaction ceases, it can be reinitiated by adding an additional quantity of ferric chloride. Elimination of the catalyst from the solid polymer product can be accomplished by cutting the product into small sections and washing it with acetone or a mixture of acetone and water in which the higher polymer is practically insoluble. The catalyst can be removed from the liquid polymers by dissolving the product in benzene or diethyl ether followed by washing with water. The purified polymer is recovered by evaporating the benzene layer to dryness.

The molecular weight of the products can be determined for those products soluble in organic solvents by the differential vapor pressure techniques at 100° and 130° C. using as a medium o-chlorobenzene or any other suitable material. It has been found that in order to obtain a high molecular weight material, it is necessary to use relatively pure starting materials and to react about one mole of the alkoxy-substituted neocarborane with each mole of the halogen-containing disiloxane employed.

The elastic, soft-rubbery-type polymeric materials of this invention can be cured to semihard-type rubbers which have remarkable physical properties. Cured products prepared from the novel polymers of this invention can be heated under nitrogen for six hours at 350° C. without any loss in elastic properties and with only slight discoloration. Such a cured product was immersed in a mixture of Dry Ice and acetone at −76° C.

The polymers of this invention can be cured by heating for about 1 to about 48 hours or more at a temperature of from about 70° C. to about 300° C. in the presence of an organic peroxide catalyst. Pressures of from about 100 p.s.i. to 10,000 p.s.i. are also preferably employed. Suitable peroxide catalysts include capryl, lauryl, benzoyl, dicumyl, methylethyl ketone, and di-t-butyl peroxides, t-butyl hydroperoxide and cumene hydroperoxide, or any other peroxide which will have a long enough half life to ensure curing at the elevated temperatures employed. The half-life of an organic peroxide is defined as the time required for half of the peroxide present to decompose.

The quantity of peroxide utilized will vary from about 0.1 percent to about 10 percent based on the weight of the polymer in the composition being cured. The amount of the peroxide catalyst required will depend on the particular peroxide employed. The preferred quantity of peroxide will be between 0.2 percent and 3 percent based on the polymer weight. The most useful peroxides are those with the highest half lives at the most useful curing temperature range which is between about 100° and about 150° C. Such peroxides are exemplified by dicumyl, methyl ethyl-ketone, and di-t-butyl peroxide, t-buyl hydroperoxide cumenehydroperoxide, and 2,5-bis(tert. butylperoxy)-2,5-dimethyl hexane. Peroxides with short half-lives in the 100° and 150° C. temperature range can be utilized if longer curing times at these lower temperatures can be tolerated. Oxides of lead, mercury and zinc, glass fiber, silica fiber, asbestos, etc., can be used as fillers for the polymers of this invention. In addition, pigment type fillers such as titanium dioxide, lithopone and iron oxide, can also be employed.

Finely divided silica of all types, such as precipitated silica, etc., is especially valuable as a filler for use with the polymers of this invention. Silica having a particle size of from about 0.005 micron to about 0.050 micron is particularly useful as a reinforcing agent and filler.

Example I

Bis(methoxydimethylsilyl) neocarborane (3.706 g., 0.0127 mole), tetramethyldichlorodisiloxane (2.581 g., 0.0127 mole) and 2 mole percent of anhydrous ferric chloride (based on the total number of moles of the neocarborane compound employed) were added to a 25 ml. single-necked flask equipped with a condenser, stirring bar and a nitrogen inlet line. The reaction flask was connected to a vacuum line having a bubble-off to which there was connected a wet test meter for the purpose of measuring the gas evolved. The flask was placed in oil bath and a slight gas evolution commenced at 55° C. (oil bath temperature). The temperature was raised to 110°–130° C. and maintained in this range until approximately 0.35 liter of gas had been evolved after which the gas evolution slowed down considerably. The gas evolution resumed when the temperature of the oil bath was raised to about 180° C. After 0.53 liter of gaseous methyl chloride had been evolved, (93 percent of the theoretical amount) a viscous liquid polymeric product was obtained. This product was dissolved in ether, filtered and the filtrate shaken several times with water to eliminate the ferric chloride. The ether layer was dried over magnesium sulfate, evaporated to dryness, and placed under vacuum at 150–160° for about 2 hours. The polymeric product which was recovered, still a viscous liquid, had a molecular weight of 3202.

Infrared analysis indicated that the product was composed essentially of units corresponding to the formula:

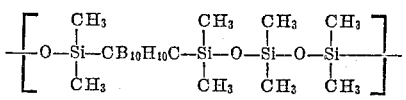

Example II

This experiment was conducted in a manner identical with Example I except that purer and larger amounts of materials were used. The methoxy neocarborane compound, a low melting material, was recrystallized and the disiloxane compound was restilled. Bis(methoxydimethylsilyl) neocarborane (22.638 g. 0.07059 mole), which had been purified by recrystallization from tetramethyldichlorodisiloxane (14.346 g. 0.07059 mole) which had been purified by redistillation and 2 mole percent of anhydrous ferric chloride, (based on the number of moles of the neocarborane compound utilized) were reacted in the same manner as described in Example I. After 2.70 liter of gaseous methyl chloride had been evolved, a semisolid polymeric product formed. In the final phase of this experiment, the polymeric product was maintained at 180°

C. for 2 hours and there was obtained a polymeric gum which was not soluble in common organic solvents.

The polymeric gum, when heated to a temperature above 260° C. softened somewhat but even at 350° C. it remained a rubbery material.

The product, which was obtained in 85.5 percent yield based on the weight of the neocarborane starting material, was analyzed for carbon, hydrogen, boron and silicon and the following results were obtained:

*Analysis.*—Calcd. for $C_{10}H_{34}B_{10}Si_4$: C, 28.63; H, 8.10; B, 25.58; Si, 26.50. Found: C, 28.25; H, 8.13; B, 26.16; Si, 25.88.

Based on the elemental analysis and on an infrared analysis it was determined that the product consisted essentially of recurring units of the formula:

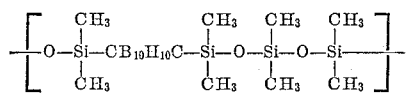

Example III

Bis(methoxydimethylsilyl) neocarborane (5.642 g., 0.0176 mole) tetramethyldichlorodisiloxane (3.577 g. 0.0176 mole) and 2 mole percent of anhydrous ferric chloride (based on the number of moles of the neocarborane starting material) were reacted as in Example I. After 0.74 liter (about 93 percent of the stoichiometric amount of methyl chloride) had been evolved a viscous liquid, polymeric product resulted which was soluble in ether, acetone, benzene and other solvents. By infrared analysis it was determined that the product was composed of units identical to that of the product of Example II.

Example IV

Bis(methoxydimethylsilyl) neocarborane (6.208 g. 0.01935 mole), tetramethylidichlorodisiloxane (3.932 g., 0.01935 mole) and 2 mole percent of anhydrous ferric chloride (based on the number of moles of the neocarborane employed) were reacted in the same manner as described in Example I. When the product was fairly gummy and approximately 95.6 percent of the stoichiometric amount of methyl chloride had been evolved the reaction was stopped. The gummy product was cut into small pieces, washed twice with acetone and twice with acetone-water (9:1) mixture to eliminate the ferric chloride catalyst and then taken to dryness under vacuum at 150°–160° C. The yield of product thus obtained was 84 percent. The product by infrared analysis was shown to be composed of units identical to that of the product of Example II.

Example V

Bis(methoxydimethylsilyl) neocarborane (6.310 g. 0.01967 mole) tetramethyldichlorodisiloxane (3.998 g. 0.01967 mole) and 2 mole percent of anhydrous ferric chloride (based on the number of moles of the starting neocarborane) were reacted in the same manner as in Example I.

After 0.59 liter of gas had been evolved during heating between 100° to 190° C. the gas evolution practically stopped, with the change of the color of the solution from orange to green. An additional quantity of ferric chloride was added and when the reaction mixture was heated to 180°–190° C. the evolution of gas commenced again and the reaction proceeded to completion. The resulting polymer was a viscous liquid of molecular weight of 3673 which was shown by infrared analysis to be composed of units identical to that of the product of Example II.

Example VI

Bis(methoxydimethylsilyl) neocarborane (11.873 g., 0.03702 mole) tetramethyldichlorodisiloxane (7.524 g. 0.0370 mole) and 2 mole percent of anhydrous ferric chloride (based on the number of moles of the neocarborane starting material utilized) were reacted in the same manner as in Example I. The polymeric product thus-prepared was a very viscous liquid which would flow only very slowly and which had a molecular weight of 6920.

By infrared analysis it was determined that the product was composed of units identical to that of the product of Example II.

Example VII

Bis(methoxydiphenylsilyl) neocarborane (3.13 g., 0.0055 mole), tetramethyldichlorodisiloxane (1.12 g., 0.0055 mole) and 2 mole percent of anhydrous ferric chloride (based on the number of moles of the neocarborane starting material added) were mixed in a 10 ml. single-necked flask which was equipped with condenser stirring bar and a nitrogen inlet line. The reaction flask was connected to a vacuum line having a "bubble-off" to which there was connected a wet test meter for the purpose of measuring the gas evolution. The flask was placed on an oil bath, heating was commenced, and at 151° C. gas evolution started. After about 15 minutes when about half of the expected gas evolution had taken place the reaction ceased. An additional quantity of ferric chloride was added (about 1 mole percent based on the weight of neocarborane derivative initially added to flask) to the mixture and the mixture was then heated to 180° C. at which temperature the evolution of gas commenced. The total amount of gas evolved was 0.19 liter (77 percent of the theoretical amount). The resulting product was a very viscous polymeric liquid, which was dissolved in ethyl ether, filtered and the filtrate taken to dryness yielding a liquid polymeric free of ferric chloride catalyst. The molecular weight of the polymeric product was determined and found to be 1934.

The product was analyzed for hydrogen, boron, silicon and the following results were obtained:

Calculated for $C_{30}H_{42}B_{10}O_3Si_4$: H, 6.31; B, 16.12; Si, 16.74. Found: H, 6.47; B, 18.49; Si, 16.0.

By infrared analysis it was determined that the products were composed of units identical to that of the product of Example II.

Example VIII

Bis(methoxydimethylsilyl) neocarborane (33.5 g., 0.10308 mole), tetramethyldichlorodisiloxane (20.94 g., 0.10308 mole), and 2 mole percent anhydrous ferric chloride (based on the number of moles of the starting neocarborane) were reacted in the same manner as in Example I. The resulting polymer, which was an elastic, soft, rubber-type product was obtained in a yield of 93 percent.

By infrared analysis it was determined that the product was composed of units identical to that of the product of Example II.

Example IX 3.0 g. of the polymer prepared in Example IV was milled together with 0.03 g. of dicumyl peroxide (40 percent by weight) supported on calcium carbonate and 0.05 g. of finely divided silica (average particle size about 0.015 micron).

The resulting mix was cured in an oven at 150° C. for 16 hours yielding a cured rubber-like product which was tacky. Heating was continued for 28 hours more at 150° C. and a non-tacky, black, rubber-like product resulted.

Example X

To 4.50 g. of the polymer prepared in Example IV there was added and milled in 0.30 g. dicumyl peroxide (40 percent by weight) on calcium carbonate and 0.25 g. of finely divided silica (average particle size about 0.015 microns). The milled composition was placed in a 2" diameter round mold and maintained under 3000 p.s.i. pressure for 2 hours at 150° C. and 18 hours at 200° C. A soft, elastic, tacky rubber resulted.

Example XI

To 2.0 g. of polymer prepared in Example VI there was added and milled in 0.03 g. dicumyl peroxide (40 percent by weight) on calcium carbonate and 0.20 g. of iron oxide pigment. The milled polymer composition was cured for 48 hours at 150° C. yielding an elastic, soft rubber.

Example XII

A total of 5 g. of the polymer prepared in Example VIII was milled together with 1.25 g. of finely divided silica having an average particle size of about 0.016 micron and 0.05 g. of 2,5-bis(tert. butylperoxy)-2,5-dimethylhexane and was placed in a 2 inch diameter mold which had been preheated to 165° C. and pressed to 1000 p.s.i. The sample was maintained at 1000 p.s.i. at a temperature of 160° C. for two hours and then allowed to cool off under pressure and finally cured by heating for 16 hours at 200° C. in a circulating air heated oven. The resulting cured material was a highly elastic, translucent, rubbery product which exhibited an elongation of over 100 percent and a tensile strength of over 300 p.s.i.

The polymeric products of this invention are useful in a wide variety of applications such as for gaskets, O-rings, encapsulation materials, etc., especially where the ability to withstand elevated temperatures is required.

What is claimed is:

1. A linear polymeric condensation product having essentially units of the structure:

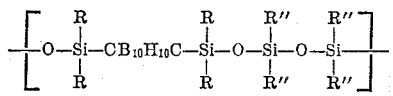

wherein each R and R″ substituent is independently selected from the group consisting of alkyl of from 1 to 6 inclusive carbon atoms and aryl of not more than 8 carbon atoms, the said linear polymeric condensation product having a molecular weight of from about 2000 to about 100,000.

2. The product of claim 1 wherein each R and each R″ is —$CH_3$.

3. The product of claim 1 wherein each R is —$CH_3$ and each R″ is phenyl.

4. A curable composition comprising (A) a linear polymeric condensation product having essentially units of the structure:

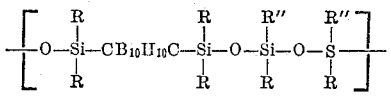

wherein each R and R″ substituent is independently selected from the group consisting of alkyl of from 1 to 6 inclusive carbon atoms and aryl of not more than 8 carbon atoms, the said linear polymeric condensation product having a molecular weight of from about 2000 to about 100,000, and (B) an organic peroxide catalyst.

5. The curable composition of claim 4 wherein each R and R″ substituent in the said unit is —$CH_3$.

6. The curable composition of claim 4 wherein the said composition contains from about 5 to about 400 percent of an inorganic filler based on the weight of the linear polymeric condensation product.

7. The curable composition of claim 6 wherein each R and R″ substituent in the said units is —$CH_3$, wherein the inorganic filler is silica having an average particle size of from about 0.005 micron to about 0.050 micron and wherein the said catalyst is dicumyl peroxide.

8. The curable composition of claim 6 wherein each R and R′ substituent in the said units is —$CH_3$, wherein the inorganic filler is silica having an average particle size of from about 0.005 micron to about 0.050 micron and wherein the said catalyst is 2,5-bis(tert. butylperoxy)-2,5-dimethylhexane.

9. The product formed by curing the composition of claim 4.

References Cited

UNITED STATES PATENTS 3,137,719   6/1964   Papetti _____ 260—488.2
3,226,429   12/1965  Crafstein et al. _____ 260—606.5

OTHER REFERENCES

Grafstein et al.: "Inor. Chem.," vol. 2, No. 6, December 1963, pp. 1128–1133.

K. A. Andrianov: "Polymers with Inorganic Main Chains," U.S. Department Com. Clear. House, JPRS: 20, 272; TT63–3141, July 1963, pp. 253–260 relied upon.

W. S. Penn: Synthetic Rubber Technology, vol. 1, Maclaren and Sons Ltd., London, 1960, pp. 280, 291–3 relied upon.

JULIUS FROME, *Primary Examiner.*

J. E. CALLAGHAN, *Assistant Examiner.*